(12) United States Patent
Tojima (10) Patent No.: US 6,809,680 B2
(45) Date of Patent: Oct. 26, 2004

(54) OBSTACLE DETECTING APPARATUS OF VEHICLE

(75) Inventor: Masanori Tojima, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/277,188

(22) Filed: Oct. 22, 2002

(65) Prior Publication Data

US 2003/0083818 A1 May 1, 2003

(30) Foreign Application Priority Data

Oct. 31, 2001 (JP) ........................................ 2001-334753

(51) Int. Cl.[7] ............................................. G01S 13/93
(52) U.S. Cl. .......................................... 342/70; 342/72
(58) Field of Search .................... 342/70, 72; 701/301; 340/435

(56) References Cited

U.S. PATENT DOCUMENTS 5,530,651 A * 6/1996 Uemura et al. ............. 701/301
5,612,883 A   3/1997 Shaffer et al.
2003/0083818 A1 * 5/2003 Tojima ........................ 342/70

FOREIGN PATENT DOCUMENTS

JP           4-163250 A       6/1992

* cited by examiner

*Primary Examiner*—Daniel Pihulic
(74) *Attorney, Agent, or Firm*—Varndell & Varndell, PLLC (57) ABSTRACT

In detecting an obstacle of a vehicle, to be able to eliminate dead angle, shorten a detection period and reduce erroneous detection of the obstacle, when a vehicle runs on a running road, by pivoting a pivoting radar in a direction in accordance with a progressing direction of the vehicle, a total or a portion of a detection range of the pivoting radar can be made to be outside of a detection range of fixed radars. Therefore, an obstacle in a range outside of the detection range of the fixed radars can be detected by the pivoting radar.

9 Claims, 7 Drawing Sheets

OBSTACLE DETECTING APPARATUS OF VEHICLE

BACKGROUND OF THE INVENTION

1. Field of the Invention

The present invention relates to an apparatus of detecting an obstacle of a vehicle such as an unmanned vehicle.

2. Description of the Related Art

An unmanned vehicle such as an unmanned dump truck operated in a wide site such as a quarrying site or a mine, automatically detects an obstacle in front of the vehicle and is automatically controlled to run based on a result of the detection. In this case, an unmanned vehicle such as an unmanned dump truck is generally wide in the vehicle width, a width of a running road therefor is also wide and therefore, in an obstacle detecting apparatus mounted on the unmanned vehicle, there is requested a function capable of catching an obstacle in a wide detection area.

As an obstacle detecting apparatus, there have conventionally known various kinds of radars such as an optical laser, a millimeter wave radar, and a visual sensor.

The radar is provided with an advantage of high accuracy and is preferable for mounting on an unmanned vehicle. In mounting the radar on the unmanned vehicle, there are various systems for covering the wide detection area as shown by items 1), 2), and 3), described below.

Figure 11:
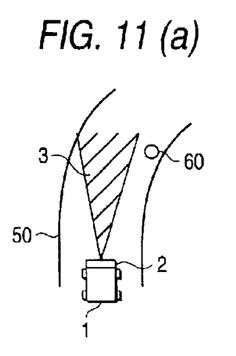
FIGS. 11(a), 11(b) and 11(c) are views for explaining respective radar systems.

1) Fixed Scanning Radar System:

According to the system, as shown by FIG. 11(*a*), a radar 2 is mounted on an unmanned vehicle 1 and radar beam 3 is scanned at high speed in a left and right direction in a range of about ±10° to thereby detect an obstacle 60 on a running road 50.

2) Rotary Radar System:

According to the system, as shown by FIG. 11(*b*), the radar 2 is mounted on the unmanned vehicle 1 and the radar beam 3 is rotated by 360° centering on the unmanned vehicle 1 to thereby detect the obstacle 60 on the running road 50.

3) Pivoting Scanning Radar System:

According to the system, as shown by FIG. 11(*c*), the radar 2 is mounted on the unmanned vehicle 1 via a pivoting base, the radar beam 3 is scanned at high speed in the left and right direction in a range of about ±10° and the radar beam 3 is pivoted by pivoting the pivoting base at low speed to thereby detect the obstacle 60 on the running road 50.

An absolute position of the obstacle 60 can be measured by measuring an azimuth angle (scanning angle) of the radar beam 3 and a distance from the radar 2 to the obstacle 60 and based on measured values of these and the position and the azimuth angle of the unmanned vehicle 1. Further, in the case of the pivoting scanning radar system of the above-described item 3), it is necessary to measure the absolute position of the obstacle 60 by measuring a pivoting angle of the pivoting base.

Further, there is also known a technology combined with the above-described items 1) and 3). For example, according to JP-A-4-163250, there is described invention with regard to a rear view sensor of a general automobile combining the fixed radar system of item 1) and the pivoting radar system of item 3) and the pivoting radar is pivoted in a direction of the obstacle caught by the fixed radar to thereby further catch the obstacle by the pivoting radar.

Further, in U.S. Pat. No. 5,612,883, there is described invention changing a scanning range in a pivoting scanning radar system.

Further, according to the literature, there is described invention successively measuring absolute positions of respective objects detected by radar beam to thereby determine whether the respective objects are the same obstacle.

When the fixed scanning radar system of FIG. 11(*a*) is adopted, although accuracy in measuring the azimuth angle of the radar beam 3 is excellent and the obstacle 60 on a running road having a small curve can be detected, since a scanning area of the radar beam 3 is narrow, dead angle is present at a cross point and a sharp curve and there is a concern of overlooking the obstacle 60.

Further, when the rotary radar system of FIG. 11(*b*) is adopted, the radar beam 3 is rotated by 360° and therefore, there is not dead angle, however, since a detection period is long, it is wasteful to only detect the obstacle 60 on the front side and a considerable period of time is required for catching the obstacle 60. Particularly, when the unmanned vehicle 1 is running at high speed (50 km/h), a considerable distance may be run until detecting the front obstacle 60 and there is a concern of interfering with the obstacle 60.

When the pivoting scanning radar system of FIG. 11(*c*) is adopted, there is not the dead angle and also the detection period is short and therefore, the system covers drawbacks of the fixed scanning radar system and the rotary radar system.

However, in order to measure the absolute position of the obstacle 60, not only the azimuth angle (scanning angle) of the radar beam 3 and the azimuth angle of the unmanned vehicle but also a pivoting angle of the pivoting base must be measured and measurement errors of the angles are accumulated to thereby enlarge measurement error of the position of the obstacle. Since accuracy of the angles are poor in this way, the obstacle 60 at outside of the running road 50 is liable to be detected erroneously as the obstacle 60 in the running road 50.

The invention has been carried out in view of the actual situation and it is a problem to be resolved to eliminate the dead angle, to be able to shorten the detection period and to reduce erroneous detection of the obstacle in detecting the obstacle of the vehicle.

Now, as described above, according to U.S. Pat. No. 5,612,833, in order to determine the same obstacle, the absolute positions of the respective objects are successively measured.

However, when the absolute positions of the objects are successively measured, the operational processing becomes complicated.

Hence, according to the invention, it is a problem to be resolved to be able to determine the same obstacle without carrying out the complicated operational processing.

SUMMARY OF THE INVENTION

According to a first aspect of the invention, there is provided an obstacle detecting apparatus of a vehicle for detecting an obstacle of a vehicle by using a radar, the obstacle detecting apparatus comprising a fixed radar fixed to the vehicle, and a pivoting radar pivotable relative to the vehicle, wherein the pivoting radar is pivoted in a direction in accordance with a progressing direction of the vehicle such that radar beam is emitted in the direction in accordance with the progressing direction of the vehicle.

Figure 6:
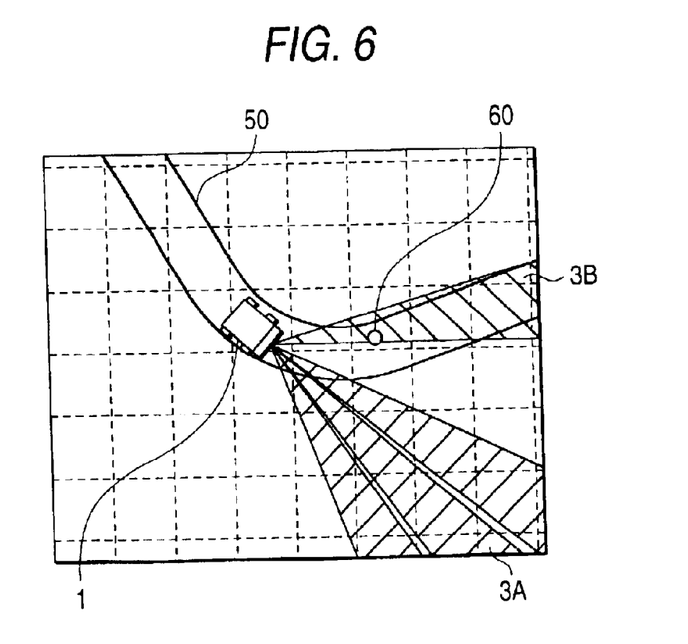
FIG. 6 is a view for explaining a behavior of detecting outside of the detection range of the fixed radar by the pivoting radar.

According to the first aspect of the invention, as shown by FIG. 6, when a vehicle 1 runs on a running road 50, by pivoting a pivoting radar 24 in a direction in accordance with a progressing direction of the vehicle 1, a total or a portion of a detection range 3B of the pivoting radar 24 can be made to be outside of a detection range 3A of fixed radars 21 through 23. Therefore, an obstacle 60 in a range outside of the detection range of the fixed radars 21 through 23 can be detected by the pivoting radar 24.

Therefore, in detecting the obstacle 60 of the vehicle 1, dead angle can be eliminated. That is, since the fixed radars 21 through 23 and the pivoting radar 24 are provided, the detection range of the obstacle can be covered with respect to both a linear road or the running road 50 having a large radius of curvature shown in FIG. 7 and the running road 50 having a small radius of curvature such as a cross point or a sharp curve shown in FIG. 6. Further, since both of the fixed radars 21 through 23 and the pivoting radar 24 are used, a detection period can be shortened. Further, since the pivoting radar 24 is used along with the fixed radars 21 through 23, erroneous detection of the obstacle can be reduced.

According to a second aspect of the invention, there is provided an obstacle detecting apparatus of a vehicle for detecting an obstacle of a vehicle by using a radar, the obstacle detecting apparatus comprising a fixed radar fixed to the vehicle, and a pivoting radar pivotable relative to the vehicle, wherein by simultaneously emitting fluxes of radar beam from both of the fixed radar and the pivoting radar, the same obstacle is detected by the two radars.

Figure 7:
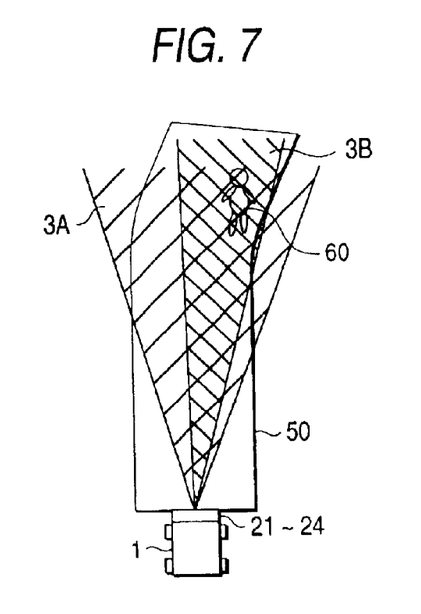
FIG. 7 is a view for explaining a behavior of detecting a range duplicated with the detection range of the fixed radar by the pivoting radar.

According to the second aspect of the invention, as shown by FIG. 7, when the vehicle 1 runs on the running road 50, both of the fixed radars 21 through 23 and the pivoting radar 24 are simultaneously and redundantly detect the obstacle 60 and therefore, the obstacle 60 can be detected highly reliably.

According to a third aspect of the invention, there is provided an obstacle detecting apparatus of a vehicle for detecting an obstacle of a vehicle by using a radar, the obstacle detecting apparatus comprising a fixed radar fixed to the vehicle, and a pivoting radar pivotable relative to the vehicle, wherein the pivoting radar is pivoted such that radar beam is emitted in a range outside of a detection range of radar beam emitted from the fixed radar.

According to the third aspect of the invention, as shown by FIG. 6, when the vehicle 1 runs on the running road 50 having a small radius curvature, by pivoting the pivoting radar 24, a total or a portion of the detection range 3B of the pivoting radar 24 can be made to be outside of the detection range 3A of the fixed radars 21 through 23 and by the pivoting radar 24, the obstacle 60 in the range outside of the detection range of the fixed radars 21 through 23 can be detected by the pivoting radar 24.

According to a fourth aspect of the invention, in the first or second or third aspect of the invention, different weights are added to a case of detecting an object by the fixed radar and a case of detecting the object by the pivoting radar and the detected object is determined to be the obstacle based on a total value of the weights.

The fixed radars 21 through 23 are not pivoted and therefore provided with small error in angle accuracy, excellent in accuracy of measuring the position of the obstacle 60, hardly detect erroneously that the obstacle 60 is outside of the running road 50 and is highly reliable.

In contrast thereto, the pivoting radar 24 is pivoted and therefore is provided with a large error in the angle accuracy, poor in the accuracy of measuring the position of the obstacle 60, frequently detects erroneously that the obstacle 60 is outside of the running road 50 and is provided with low reliability.

Figure 8:
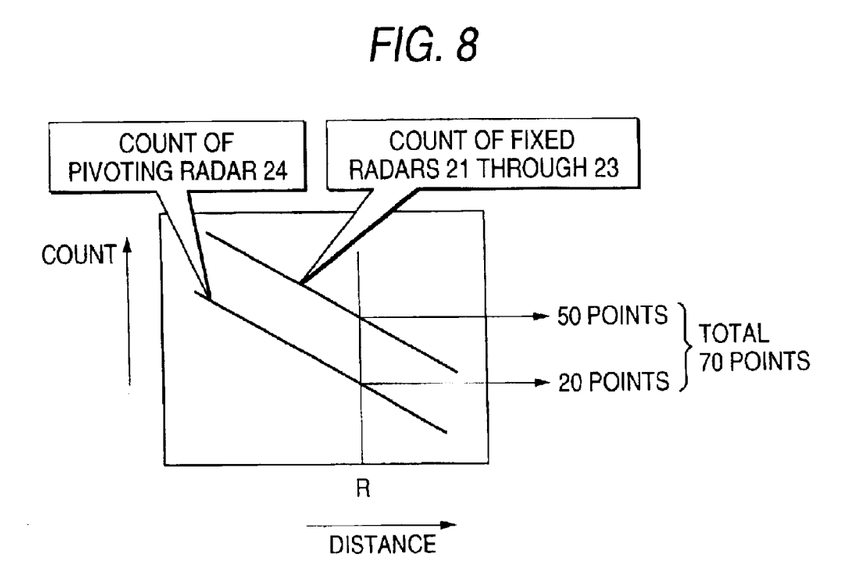
FIG. 8 is a diagram for explaining that different weights (counts) are added to the fixed radar and the pivoting radar.

In this way, the reliability differs for the respective "radar systems" and therefore, weight (count) is made to differ according to the respective systems. That is, as shown by FIG. 8, the fixed radars 21 through 23 are more reliable than the pivoting radar 24 and therefore, is given a weight (count) larger than a weight (count) when the obstacle is detected by the pivoting radar 24.

In this way, there is added weight (count) which differs by the case of detecting the object by the fixed radars 21 through 23 and the case of detecting the object by the pivoting radar 24 and the detected object is determined to be the "obstacle" based on a total value of the weights (counts).

According to a fifth aspect of the invention, there is provided an obstacle detecting apparatus of a vehicle for detecting an obstacle of a vehicle by using a radar, the obstacle detecting apparatus comprising a fixed radar fixed to the vehicle and a pivoting radar pivotable relative to the vehicle, wherein different weights are added to a case of detecting an object by the fixed radar and a case of detecting the object by the pivoting radar and the detected object is determined to be the obstacle based on a total value of the weights.

The fifth aspect of the invention is the aspect of invention constituting an independent aspect by the fourth aspect of the invention.

According to a sixth aspect of the invention, there is provided an obstacle detecting apparatus of a vehicle for detecting an obstacle of a vehicle by using a radar wherein the vehicle is mounted with a plurality of radars which differ in at least either one of a system and a kind thereof, different weights are added for the respective systems and the respective kinds of the radars, and when an object is detected by the respective radars, the detected object is determined to be the obstacle based on a total value of the weights.

The fifth aspect of the invention is applicable to a case of combining three or any two of the respective radar systems shown in FIGS. 11(a), 11(b) and 11(c). For example, the fixed radar system of FIG. 11(a) and the rotary radar system of FIG. 11(b) are combined, there is added the weight (count) which differs by the case of detecting the object by the fixed radar and the case of detecting the object by the rotary radar and the detected object is determined to be the "obstacle" based on a total value of the weights (counts).

Further, the weight (count) can be made to differ also in accordance with the kind of radar (whether the radar is an optical radar, or a millimeter wave radar, or a visual sensor).

According to a seventh aspect of the invention, there is provided an obstacle detecting apparatus of a vehicle for detecting a plurality of obstacles of a vehicle by using a radar, the obstacle detecting apparatus comprising predicted distance calculating means for successively calculating, when an object is detected by the radar, a predicted distance from the vehicle to the detected object thereafter, distance measuring means for measuring a distance from the vehicle to the detected object at each time of detecting the object by the radar, count adding means for comparing a distance measured by the distance measuring means and the predicted distance calculated by the predicted distance calculating means, determining whether the detected object is the same as the object detected in the past and successively adding a count of a corresponding one of the detected object when the detected object is determined to be the same as the object detected in the past at each time of detecting the object by the radar, and obstacle determining means for determining that the corresponding one of the detected object is the obstacle when the counts added by the count adding means become equal to or larger than a predetermined threshold.

As shown in FIG. 9(b), at each time of detecting an obstacle candidate 61 (62, 63) by radars 21 through 24, as described above, a distance R from the vehicle 1 to the obstacle candidate 61 (62, 63) is measured.

Meanwhile, at an inner portion of the vehicle 1, as shown by FIG. 9(a), when the obstacle candidate 61 (62, 63) is newly detected by the radars 21 through 24, thereafter, a predicted distance Rexp from the vehicle 1 to the obstacle candidate 61 (62, 63) is successively calculated at each time of elapse of a predetermined time period Δt.

Further, at each time of detecting the obstacle candidate 61 (62, 63) by the radars 21 through 24, the measured distance R and the predicted distance Rexp are compared and it is determined whether the detected obstacle candidate is the same as the obstacle candidate detected in the past.

As a result, when it is determined that the detected obstacle candidate is the same as the obstacle candidate detected in the past, a constant count is successively added to a kind of a list of the obstacle candidate.

Further, when the count of the list becomes equal to or larger than a predetermined threshold (100 points), the obstacle candidate of the list is determined to be the "obstacle".

According to the seventh aspect of the invention, it is not necessary to successively measure an absolute position of respective objects in order to determine the same obstacle as in U.S. Pat. No. 5,612,883, described above, but the distance may be measured and predicted. Therefore, in comparison with the case of successively measuring the absolute position of the object, the calculating processing is simplified and the same obstacle can be determined without carrying out complicated calculating processing.

DETAILED DESCRIPTION OF THE PREFERRED EMBODIMENTS

An explanation will be given of embodiments of an obstacle detecting apparatus of a vehicle according to the invention in reference to the drawings as follows.

Further, according to the embodiment, an unmanned vehicle such as an unmanned dump truck (hereinafter, referred to as vehicle) is assumed as the vehicle. However, the embodiment described below is applicable not only to an unmanned vehicle but also to a manned vehicle. Further, according to the embodiment, a scanning radar for scanning radar beam is assumed as the radar. However, the embodiment described below is not limited to the scanning radar but is applicable also to a radar which does not scan.

Figure 2:
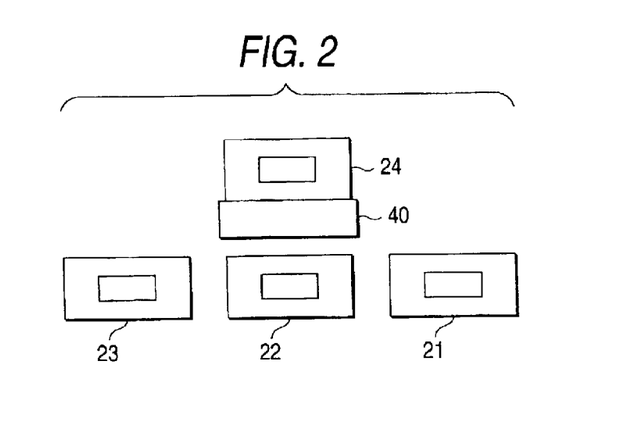
FIG. 2 is a view viewing radars mounted on a vehicle of the embodiment from a front side of the vehicle.

FIG. 2 shows an example of arranging respective radars mounted on a vehicle 1 of the embodiment.

FIG. 2 is a view viewing the vehicle 1 from the front side and three pieces of fixed radars 21, 22 and 23 and one piece of pivoting radar 24 are mounted on the vehicle 1. Further, according to the embodiment, millimeter wave radar is assumed as a kind of the radar. However, as the kind of the radar, there may be used an optical laser, a visual sensor or the like other than the millimeter wave radar. In this case, all of the radars 21 through 24 may not be the same kind of radars but may be mixed with a different kind of radar.

The fixed radars 21, 22 and 23 correspond to the fixed scanning radar 2 of FIG. 11(a). Further, the pivoting radar 24 corresponds to the pivoting scanning radar 2 of FIG. 11(c).

The fixed radars 21, 22 and 23 are fixed to the vehicle 1.

The vehicle 1 is pivotably provided with a pivoting base 40. The pivoting radar 24 is provided above the pivoting base 40. Therefore, by pivoting the pivoting base 40, the pivoting radar 24 is pivoted relative to the vehicle 1.

Figure 3:
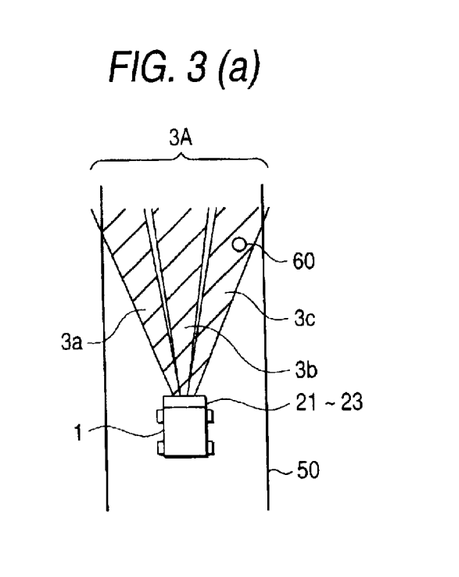
FIGS. 3(a) and 3(b) are views showing scanning areas of the radars of the embodiment.

FIGS. 3(a) and 3(b) respectively show scanning ranges of the fixed radars and the pivoting radar.

As shown by FIG. 3(a), fluxes of radar beams 3a, 3b and 3c are respectively emitted from the fixed radars 21, 22 and 23 for respectively scanning predetermined ranges. A scanning area totalizing scanning areas of the respective fixed radars 21, 22 and 23 is designated by notation 3A. Therefore, in accordance with progress of the vehicle 1 along a running road 50, the fixed radars 21, 22 and 23 detect an obstacle 60 within the scanning area 3A on the front side of the vehicle 1.

Further, as shown by FIG. 3(b), radar beam 3d is emitted from the pivoting radar 24 for respectively scanning a predetermined range. The scanning area is designated by notation 3B. When the pivoting base 40 is pivoted, as shown by an arrow mark the scanning area 3B is pivoted. Therefore, in accordance with progress of the vehicle 1 along the running road 50, the pivoting radar 24 detects the obstacle 60 within a range of the scanning area 3B in a pivoting direction.

Figure 1:
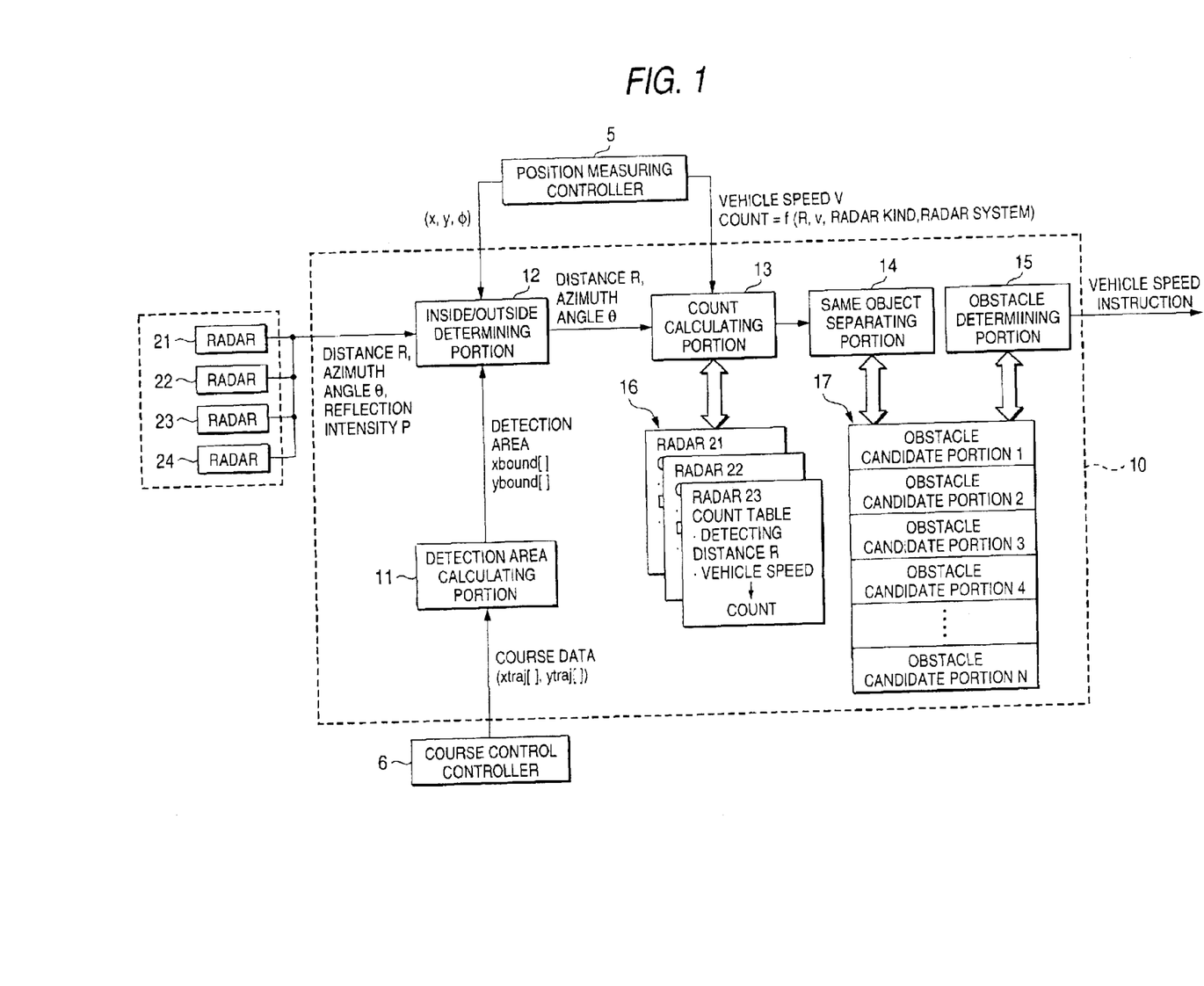
FIG. 1 is a block diagram showing a constitution of an obstacle detecting apparatus according to an embodiment.

FIG. 1 shows a position measuring controller 5 mounted on the vehicle 1, a course control controller 6 and a safety controller 10.

The safety controller 10 determines the obstacle 60 of the vehicle 1 based on outputs of the radars 21, 22, 23 and 24 and controls vehicle speed such that vehicle does not interfere with the obstacle 60 when the safety controller 10 determines the obstacle 60.

The safety controller 10 comprises a detection area calculating portion 11, an inside/outside determining portion 12, a count calculating portion 13, a same obstacle searching portion 14, an obstacle determining portion 15, a data table 16 and an obstacle candidate storing portion 17.

First, an explanation will be given of processings executed in the detection area calculating portion 11 and the inside/outside determining portion 12 in the safety controller 10.

FIGS. 4(a), 4(b), 4(c) and 4(d) show processings of determining the object 60 detected by the radars 21 through 24 mounted on the vehicle 1 to be an "obstacle" of the vehicle 1. Further, in the specification, an "obstacle" signifies an object having a possibility of interfering with the vehicle 1 and specifically refers to an object present in the running road 50 in front of the vehicle 1.

Figure 4:
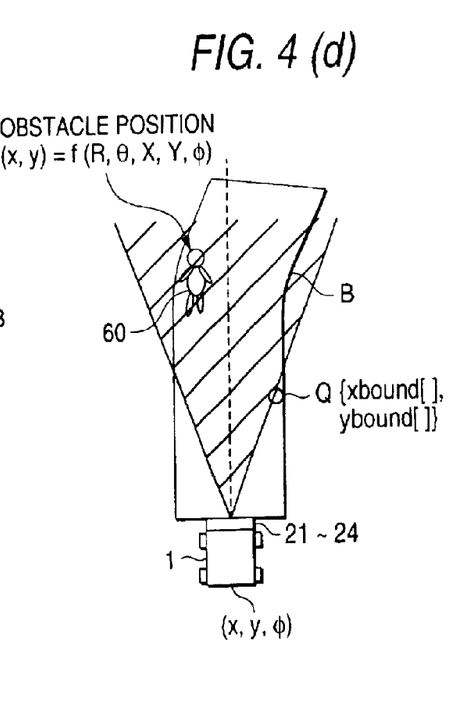
FIGS. 4(a), 4(b), 4(c) and 4(d) are views for explaining a procedure of processings until determining an obstacle on a running road from data of a running course of a vehicle and an output of a radar.

As shown by FIG. 4(a), the unmanned vehicle 1 is controlled to be guided and run by so-to-speak predicting navigation along a target course 7. That is, positions (xtraj[ ], ytraj[ ]) and azimuth angles φtraj[ ] of respective points P1, P2, P3, P4, P5 . . . on the target course 7 are caught and stored as course data. Then a successive position (X, Y) and a successive azimuth angle φ of the vehicle 1 are measured and a steering angle, running speed and the like of the vehicle 1 are controlled such that the measured successive position and azimuth angle (X, Y, φ) coincide with the course data (xtraj[ ], ytraj[ ] and azimuth angle φtraj[ ]. Successive position and azimuth angle (X, Y, φ) of the vehicle 1 are measured by the position measuring controller 5 shown in FIG. 1 and the vehicle 1 is run based on a result of the measurement.

Further, at the position measuring controller 5, successive vehicle speed V is calculated based on the successive position and azimuth angle (X, Y, φ) of the vehicle 1.

Next, as shown by FIG. 4(b), an obstacle detecting area 8 is set on a front side in a progressing direction of the vehicle 1 based on the position data (xtraj[ ], ytraj[ ]) of the target course 7. The obstacle detecting area 8 corresponds to a width of the course 50. The obstacle detecting area 8 is defined by a position (xbound[ ], ybound[ ]) of a respective point Q on a boundary line. The detection area calculating portion 11 in the safety controller 10 inputs the course data (xtraj[ ], ytraj[ ]) from the course control controller 6 and calculates the position (xbound[ ], ybound[ ]) of the respective point Q on the boundary line of the obstacle detecting area 8 based on the course data. The boundary position Q (xbound[ ], ybound[ ]) of the obstacle detecting area 8 are given as a position on an absolute coordinates system, that is, an absolute position.

Next, as shown by FIG. 4(c), by operating the fixed radars 21 through 23 and the pivoting radar 24, fluxes of radar beams are emitted to detect an object in scanning areas 3A and 3B.

As a result, as shown by FIG. 4(d), a distance R between the vehicle 1 (radars 21 through 24) and the object 60, an azimuth angle θ of the object 60 (radar beam) and a reflection intensity P when the radar beam is reflected by the object 60, are outputted and inputted to the inside/outside determining portion 12.

The inside/outside determining portion 12 is inputted with the position and azimuth angle data (X, Y, φ) of the vehicle 1 from the position measuring controller 5, the boundary position data Q (xbound[ ], ybound[ ]) of the obstacle detecting area 8 from the detecting area calculating portion 11.

Then as shown by Equation (1) shown below, the absolute position S (x, y) of the object 60 is calculated based on the distance R to the object 60, the azimuth angle θ of the object 60, the position X, Y of the vehicle 1 and the azimuth angle θ of the vehicle 1 with f1 as a predetermined function.

$$(x, y) = f1(R, \theta, X, Y, \phi) \quad (1)$$

Next, as shown by FIG. 4(c), by comparing the calculated object position S (x, y) and the boundary position data Q (xbound[ ], ybound[ ]) of the obstacle detecting area 8, it is determined whether the object position S (x, y) is disposed at the coordinates position on an inner side of the boundary line (xbound[ ], ybound[ ]), that is, whether the object 60 is disposed on the inner side or the outer side of the obstacle detecting area 8.

When the object 60 is determined to be disposed on the inner side of the obstacle detecting area 8 as a result, the detected object 60 is determined to be a candidate of the "obstacle". The above-described determination is carried out individually for the respective radars 21 through 24.

When it is determined by the inside/outside determining portion 12 that the object 60 is disposed in the obstacle detecting area 8 and the detected object 60 is the obstacle candidate, data of the distance R and the azimuth angle θ is outputted to the count calculating portion 13 for the respective radars 21 through 24.

Next, an explanation will be given of detection ranges of the fixed radars 21 through 23 and the pivoting radar 24 in reference to FIG. 5.

Figure 5:
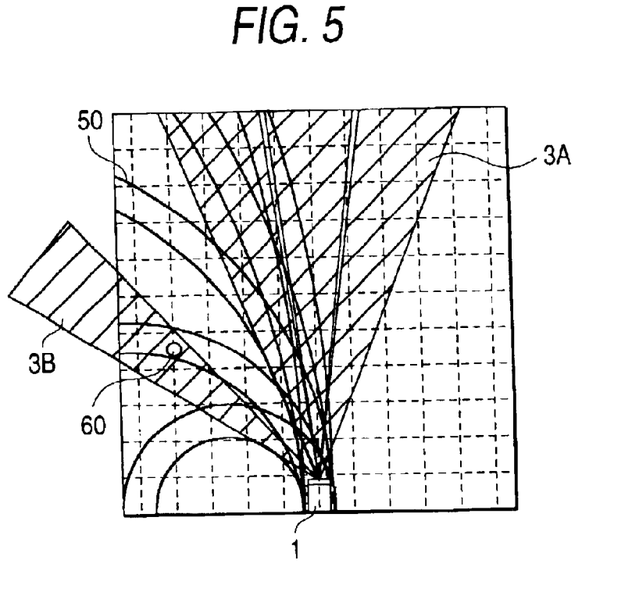
FIG. 5 is a view showing a relationship among a detection range of a fixed radar, a detection range of a pivoting radar and a radius of curvature of a running road.

FIG. 5 shows a relationship between a radius of curvature R of the running road 50 of the vehicle 1 and the detecting ranges of the fixed radars 21 through 23 and the pivoting radar 24.

As shown by FIG. 5, when the radius of curvature is up to a degree of about 100R (400R, 200R, 100R), an obstacle on the running road 50 can be detected by the fixed radars 21 through 23, however, at a smaller radius of curvature, the obstacle on the running road 50 cannot be detected by the fixed radars 21 through 23. In contrast thereto, the pivoting radar 24 can detect not only the obstacle on the running road 50 having a radius of curvature detectable by the fixed radars 21 through 23, but also the obstacle on the running road 50 having a small radius of curvature (50R, 25R . . . ) not detectable by the fixed radars 21 through 24 by pivoting the pivoting radar 24.

Therefore, as shown by FIG. 6, when the vehicle 1 runs on the running road 50 having a small radius of curvature, a total or a portion of the detection range 3B of the pivoting radar 24 can be positioned outside of the detection range 3A of the fixed radars 21 through 23 and the obstacle 60 in a range outside of the detection range of the fixed radars 21 through 23 can be detected.

Further, as shown by FIG. 7, when the vehicle 1 runs on a linear road or the running road 50 having a large radius of curvature, the pivoting radar 24 can detect the obstacle 60 in the range 3B overlapping the detection range 3A of the fixed radars 21 through 23.

As described above, since the fixed radars 21 through 23 and the pivoting radar 24 are provided, the detection range of the obstacle can be covered with respect to both of the linear road or the running road 50 having a large radius of curvature and the running road 50 having a small radius of curvature such as a cross point or a sharp curve.

Above all, as shown by FIG. 7, in the case of the linear road or the running road 50 having the large radius of curvature, both of the fixed radars 21 through 23 and the pivoting radar 24 can detect the obstacle 60 simultaneously and redundantly and therefore, the obstacle 60 can be detected with high reliability.

Pivoting control of the pivoting radar 24 can be carried out based on the measured position (X, Y) of the vehicle 1 and the course data (xtraj[ ], ytraj[ ]). For example, the progressing direction of the vehicle 1 is calculated based on the measured position (X, Y) and several points of the course data (xtraj[ ], ytraj[ ]) in front of the vehicle 1 and the pivoting radar 24 is pivoted such that radar beam can be emitted along the progressing direction.

Next, an explanation will be given of a processing until determining an "obstacle" from an "obstacle candidate".

According to the embodiment, when an obstacle candidate is determined by the inside/outside determining portion 12 of FIG. 1, a count is added by the following reference thereafter and the candidate is determined as the obstacle at a time point at which the count exceeds a predetermined threshold.

At the count adding portion 13 of FIG. 1, the count of the obstacle candidate is added by the following reference.

Now, as described in reference to FIGS. 11(a), 11(b) and 11(c), the fixed radars 21 through 23 are not pivoted and therefore, an error in angle accuracy is small, accuracy in measuring the position of the obstacle 60 is excellent, the fixed radars 21 through 23 hardly detect the obstacle 60 erroneously such that the obstacle 60 is outside of the running road 50 and is provided with highly reliable.

In contrast thereto, since the pivoting radar 24 is pivoted, the error in angle accuracy is large, the accuracy in measuring the position of the obstacle 60 is poor, the pivoting radar 24 frequently detects the obstacle 60 erroneously such that the obstacle 60 is outside of the running road 50 and is provided with low reliability.

In this way, the reliability differs according to respective "radar system" and therefore, the count is made to differ according to the respective systems. That is, as shown by FIG. 8, the fixed radars 21 through 23 are more reliable than the pivoting radar 24 and therefore, there is given a count larger than a count when the obstacle is detected by the pivoting radar 24.

Further, when the distance R to a detected object is large, there is an allowance until the detected object interferes with the vehicle 1 and therefore, the count is set to be low and time until determining the obstacle candidate as the "obstacle" is retarded. Conversely, when the distance R is small, there is not the allowance until interfering with the vehicle 1 and therefore, the count is set to be high and the time until determining the obstacle candidate as the "obstacle" is made earlier. Therefore, as shown by FIG. 8, the smaller the distance R, the higher the count and the earlier the time until determining the obstacle candidate as the "obstacle".

Similarly, when the vehicle speed V of the vehicle 1 is small, there is the allowance until the detected object interferes with the vehicle 1 and therefore, the count is set to be low and the time until determining the obstacle candidate as the "obstacle" is retarded. Conversely, when the vehicle speed V is large, there is not the allowance until interfering with the vehicle 1 and therefore, the count is set to be high and the time until determining the obstacle candidate as the "candidate" is made earlier. Therefore, the larger the vehicle speed V, the higher the count and the earlier the time until determining the obstacle candidate as the "obstacle".

According to the embodiment, a "kind of radar" is a millimeter wave radar which is the same for all of the radars 21 through 24. However, when the kind of radar is made to differ, the count can be made to differ in accordance with a reliable degree. For example, even with the fixed radars, when the radar 21 is a millimeter wave radar, the radar 22 is an optical laser and the radar 23 is a visual sensor, the count can be made to differ in accordance with the kind of the radars.

The data table 16 is stored with counts in correspondence with the system and the kind of the radar, the distance R and the vehicle speed V in a data table style.

That is, the count of the obstacle candidate can be calculated from Equation (2) shown below with f2 as a predetermined function and the distance R, the vehicle speed V, the radar system and the radar kind as parameters.

$$\text{Count} = f2(R, V, \text{radar system}, \text{radar kind}) \quad (2)$$

Then, the count calculating portion 13 inputs the distance R and the azimuth angle θ for each of the radars 21, 22, 23 and 24 (the radar system is either of fixed and pivoting, the radar kind is the millimeter wave radar) from the inside/outside determining portion 12, inputs the current vehicle speed V from the position measuring controller 5 and reads counts of obstacle candidates in correspondence with the distance R, the vehicle speed V, the radar system and the radar kind from the data table 16.

When there are present a plurality of obstacle candidates, the same obstacle searching portion 14 carries out a processing of searching which of the obstacle candidates are the same obstacle candidate. When the obstacle candidates are recognized as the same obstacle candidate as a result of search, the respective same obstacle candidates are respectively stored to respectives of list 0, list 1, list 2, list 3 ... of the obstacle candidate storing portion 17. The respectives of list 0, list 1, list 2, list 3 ... of the obstacle candidate storing portion 17, are described with counts for the respective obstacle candidates.

At the obstacle determining portion 15, there is carried out a processing in which when the count described in each of list 0, list 1, list 2, list 3 ... of the obstacle candidate storing portion 17 exceeds a reference count (threshold), an obstacle candidate of the list whose count exceeds the reference count is determined as the "obstacle".

A description will be given later of processings executed in the same obstacle searching portion 14 and the obstacle determining portion 15 in reference to FIGS. 9(a) and 9(b).

When the "obstacle" is determined at the obstacle determining portion 15, the vehicle 1 is controlled to avoid interference between the obstacle 60 and the vehicle 1. Specifically, the vehicle speed instruction is outputted to a running mechanism, not illustrated, such that the vehicle 1 is stopped. Further, the vehicle 1 may be constituted to decelerate. Further, the obstacle 60 may be avoided by controlling a steering angle instead of controlling the vehicle speed of the vehicle 1.

An explanation will be given of operation of the embodiment as follows.

1) When the vehicle 1 runs on a linear road or the running road 50 having a large radius of curvature:

As shown by FIG. 7, when the vehicle 1 runs on the linear road or the running road 50 having a large radius of curvature, the obstacle 60 in the scanning area 3A in front of the vehicle 1 is detected by the fixed radars 21 through 23 and at the same time, the obstacle 60 in the scanning area 3B overlapping the scanning area 3A of the fixed radars 21 through 23, is detected by pivoting the pivoting radar 24 in the progressing direction of the vehicle.

In this way, in the case of the linear road or the running road 50 having a large radius of curvature, both of the fixed radars 21 through 23 and the pivoting radar 24 can simultaneously and redundantly detect the obstacle 60 and therefore, the obstacle 60 can be detected highly reliably.

However, since the fixed radars 21 through 23 are highly liable, the count is set to be high and since the pivoting radar 24 is provided with low reliability, the count is set to be low and the time of reaching the count for determining the "obstacle" is made earlier in the case of the fixed radars 21 through 23.

2) Running road having a small radius of curvature:

As shown by FIG. 6, when the vehicle 1 runs on the running road 50 having a small radius of curvature, the obstacle 60 in a range outside of the scanning area 3A of the fixed radars 21 through 23 can be detected by pivoting the pivoting radar 24 in the progressing direction of the vehicle.

In this way, in the case of the running road 50 having a small radius of curvature such as a cross point or a sharp curve, outside of the detection range of the fixed radars 21 through 23 can be covered by the pivoting radar 24.

However, since the pivoting radar 24 is provided with low reliability, the count is set to be low and the time until reaching the count for determining the "obstacle" is retarded.

As described above, according to the embodiment, the fixed radars 21 through 23 and the pivoting radar 24 are provided and therefore, the detection range of the obstacle can be covered for both of the linear road or the running road 50 having the large radius of curvature and the running road 50 having the small radius of curvature such as a cross point or a sharp curve.

3) When a plurality of obstacle candidates appear in the progressing direction of the vehicle 1:

In this case, it is indispensable to determine which of detected objects are the same obstacle. An explanation will be given of processings executed in the same obstacle searching portion 14 and the obstacle determining portion 15 in reference to FIGS. 9(a) and 9(b).

FIG. 9(a) shows a behavior of updating contents of the lists at the obstacle candidate storing portion 17 and FIG. 9(b) shows a behavior of detecting a plurality of obstacle candidates by the radars 21 through 24 mounted on the vehicle 1. There is assumed a case in which obstacle candidates 61, 62 and 63 appear in the progressing direction of the vehicle 1.

As shown by FIG. 9(b), at each time of detecting the obstacle candidate 61 (62 and 63) by the radars 21 through 24, as described above, the distance R from the vehicle 1 to the obstacle candidate 61 (62, 63) is measured.

Meanwhile, at an inner portion of the vehicle 1, when the obstacle candidate 61 (62, 63) is newly detected by the radars 21 through 24, thereafter, a predicted distance Rexp from the vehicle 1 to the obstacle candidate 61 (62, 63), is successively calculated at each elapse of a predetermined time period $\Delta t$.

Figure 10:
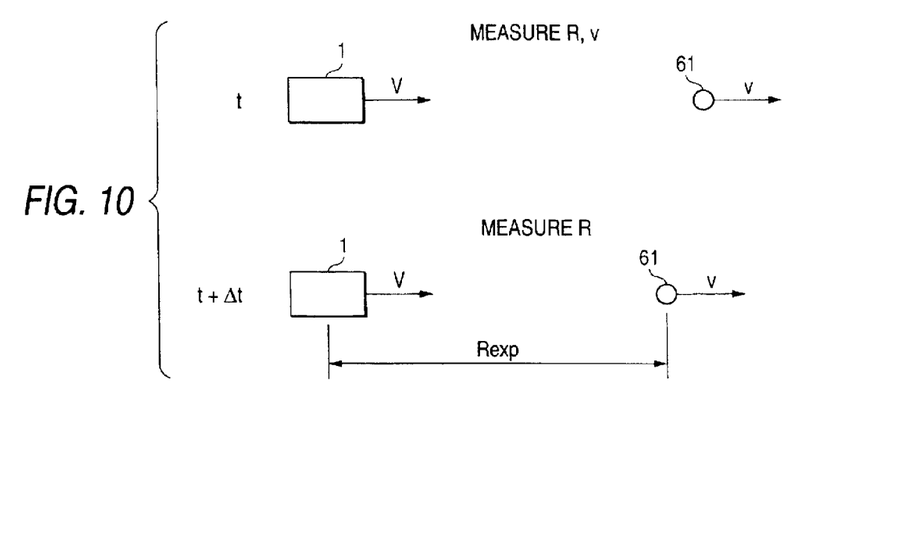
FIG. 10 is a view for explaining a content of an operational processing of a predicted distance from a vehicle to an object.

An explanation will be given of a content of a processing of calculating the predicted distance Rexp in reference to FIG. 10.

According to the embodiment, the millimeter wave radar is used and therefore, relative speed by the Doppler effect can be detected. That is, when the obstacle candidate 61 is detected by the radar at time t, relative speed (V−v) of speed v of the obstacle candidate 61 as compared with speed V of the vehicle 1 can be detected along with the distance R.

Therefore, the predicted distance Rexp when $\Delta t$ has elapsed since the obstacle candidate 61 was detected at time t, can be calculated by Equation (3) shown below by using the relative speed V−v of the obstacle candidate 61, and the measured distance R to the obstacle candidate 61 at time t.

$$Rexp = R - (V-v)\Delta t \qquad (3)$$

Further, at each time of detecting the obstacle candidate 61 (62, 63) by the radars 21 through 24, the measured distance R and the predicted distance Rexp are compared and it is determined whether the detected obstacle candidate is the same as an obstacle candidate detected in the past. Whether the obstacle candidates are the same, is determined by whether Equation (4) shown below is established.

$$Rexp = Rexp - \Delta R < R < Rexp + \Delta R \qquad (4)$$

Incidentally, $\Delta R$ is added to the predicted distance Rexp in above Equation (4), in consideration of an error in the distance.

When above Equation (4) is established and the same obstacle candidate is determined, a constant count is successively added to the count of the list of the obstacle candidate.

Further, when the count of the list becomes equal to or larger than a predetermined threshold (100 points), the obstacle candidate of the list is determined to be the "obstacle".

As shown by FIG. 9(b), at time t, when an obstacle candidate is detected by the radars 21 through 24, the measured distance R=100 m (the absolute position (x, y) of the obstacle candidate=(2500, −2000)) at that time is replaced by the predicted distance Rexp and is stored to list 0 as the new obstacle candidate 61 as shown by FIG. 9(a). When the obstacle candidate 61 is firstly detected, 30 points are added as the count.

Further, the predicted distance Rexp at the time t+$\Delta t$ at which the time period $\Delta t$ has elapsed, is calculated as 95 m and content of list 0 is updated. At time t+$\Delta t$, the obstacle candidate 61 is not detected by the radars 21 through 24 and therefore, the count described in list 0 stays to be 30 points and is not updated.

At successive time t+2$\Delta t$, when an obstacle candidate is detected by the radars 21 through 24 (refer to FIG. 9(b)), the measured distance. R=60 m at that time is compared with the predicted distance Rexp=90 m described in list 0, however, Equation (4) is not established and therefore, it is determined that the obstacle candidate is not the same as the past obstacle candidate 61 and is stored to list 1 as a new obstacle candidate 62. Further, a count of 40 points is given to list 1 as a count when the obstacle candidate 62 is firstly detected. The count (40 points) is higher than the count (30 points) when the obstacle candidate 61 is firstly detected because the distance R (=60 m) when the obstacle candidate 62 is detected, is smaller than the distance R (=100 m) when the obstacle candidate 61 is detected (refer to FIG. 9(a)).

At successive time t+3$\Delta t$, when an obstacle candidate is detected by the radars 21 through 24 (refer to FIG. 9(b)), the measured distance R=10 m at that time is compared with the predicted distances Rexp=85 m, 55 m described in list 0, list 1, however, Equation (4) is not established and therefore, it is determined that the obstacle candidate is not the same as the first obstacle candidates 61, 62 and is stored to list 2 as a new obstacle candidate 63. Further, a count of 50 points is given to list 2 as a count of firstly detecting the obstacle candidate 63. The count (50 points) is higher than the counts (30 points, 40 points) when the obstacle candidates 61, 62 are firstly detected because the distance R (=10 m) when the obstacle candidate 63 is detected, is smaller than the distances R (=100 m, 60 m) when the obstacle candidates 61, 62 are detected (refer to FIG. 9(a)).

At successive time t+4$\Delta t$, when an obstacle candidate is detected by the radars 21 through 24 (refer to FIG. 9(b)), the measured distance R=77 m at that time is compared with the predicted distances Rexp=80 m, 50 m, 5 m described in list 0, list 1, list 2. As a result, Equation (4) is established only with respect to list 0 and therefore, it is determined that the obstacle candidate is the same as the first obstacle candidate 61 and the count of list 0 is added with 30 points and total count thereof is made to be 60 points.

At successive time t+5$\Delta t$, when the count of list 2 stays to be 50 points and does not reach the threshold (100 points) and the predicted distance Rexp reaches 0 m (reaches a position to be interfered with the vehicle 1), it is determined that the obstacle candidate of list 2 is not the "obstacle" (for example, a person temporarily invades the running road 50) and the list 2 is deleted.

Figure 9:
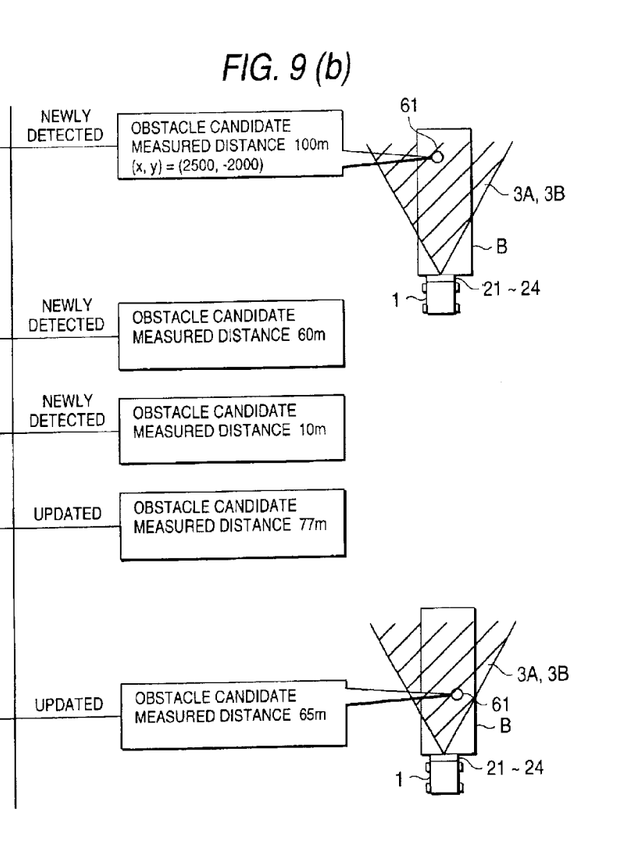
FIGS. 9(a) and 9(b) are diagrams for explaining a procedure of processings carried out by an obstacle searching portion and an obstacle determining portion the same as those shown in FIG. 1.

At successive time t+6Δt, when an obstacle candidate is detected by the radars 21 through 24 (refer to FIG. 9(*b*)), the measured distance R=65 m at that time is compared with the predicted distances Rexp=67 m, 40 m described in list 0, list 1. As a result, Equation (4) is established only with respect to list 0 and therefore, it is determined that the obstacle candidate is the same as the past obstacle candidate 61, the count of list 0 is added with 40 points and the total count is made to be 100 points.

The added count (40 points) at time t+6Δt is higher than the added count (30 points) at previous time t+4Δt because the distance R (=65 m) when the obstacle candidate 61 is detected at this time, is smaller than the distance R (=77 m) when the obstacle candidate 61 has been detected at previous time (refer to FIG. 9(*a*)).

At time t+6Δt, the count of list 0 becomes equal to or larger than the threshold (100 points) and therefore, it is determined that the obstacle candidate 61 of list 0 is the "obstacle" and the vehicle speed instruction is outputted to stop the vehicle 1. As a result, the vehicle 1 can be stopped safely without interfering with the obstacle 61.

According to the embodiment explained above, as radar systems, the fixed radars 21 through 23 and the pivoting radar 24 are combined and the counts are made to differ for the respective radar systems. However, the above-described embodiment is applicable to cases combined with three of the respective radar systems shown in FIGS. 11(*a*), 11(*b*) and 11(*c*) or any two of these. For example, the fixed radar system of FIG. 11(*a*) and the rotary radar system of FIG. 11(*b*) may be combined and the counts may differ for the respective radar systems.

What is claimed is:

1. An obstacle detecting apparatus of a vehicle for detecting an obstacle of a vehicle by using a radar, said obstacle detecting apparatus comprising:

a fixed radar fixed to the vehicle; and a pivoting radar pivotable relative to the vehicle;

wherein the pivoting radar is pivoted in a direction in accordance with a progressing direction of the vehicle based on course data, such that radar beam is emitted in the direction in accordance with the progressing direction of the vehicle.

2. An obstacle detecting apparatus of a vehicle for detecting an obstacle of a vehicle by using a radar, said obstacle detecting apparatus comprising:

a fixed radar fixed to the vehicle; and a scanning of pivoting radar pivotable relative to the vehicle;

wherein by simultaneously emitting fluxes of radar beam from both of the fixed radar and the pivoting radar, the same obstacle is detected by the two radars.

3. An obstacle detecting apparatus of a vehicle for detecting an obstacle of a vehicle by using a radar, said obstacle detecting apparatus comprising:

a fixed radar fixed to the vehicle; and a pivoting radar pivotable relative to the vehicle;

wherein the pivoting radar is pivoted based on course data, such that radar beam is emitted in a range outside of a detection range of radar beam emitted from the fixed radar.

4. The obstacle detecting apparatus of a vehicle according to claim 1:

wherein different weights are added to a case of detecting an object by the fixed radar and a case of detecting the object by the pivoting radar and the detected object is determined to be the obstacle based on a total value of the weights.

5. An obstacle detecting apparatus of a vehicle for detecting an obstacle of a vehicle by using a radar, said obstacle detecting apparatus comprising:

a fixed radar fixed to the vehicle; and a pivoting radar pivotable relative to the vehicle;

wherein different weights are added to a case of detecting an object by the fixed radar and the case of detecting the object by the pivoting radar and the detected object is determined to be the obstacle based on a total value of the weights.

6. An obstacle detecting apparatus of a vehicle for detecting an obstacle of a vehicle by using a radar, which comprises:

a plurality of radars mounted on the vehicle, and the plurality of radars differing in at least either one of a system and a kind thereof;

wherein different weights are added for detected objects based on the respective systems and the respective kinds of the radars; and wherein when an object is detected by the respective radars, the detected object is determined to be the obstacle based on a total value of the weights.

7. An obstacle detecting apparatus of a vehicle for detecting a plurality of obstacles of a vehicle by using a radar, said obstacle detecting apparatus comprising:

predicted distance calculating means for successively calculating, when an object is detected by the radar, a predicted distance from the vehicle to the detected object thereafter;

distance measuring means for measuring a distance from the vehicle to the detected object at each time of detecting the object by the radar;

count adding means for comparing the distance measured by the distance measuring means and the predicted distance calculated by the predicted distance calculating means, determining whether the detected object is the same as the object detected in the past and successively adding a count of a corresponding one of the detected object when the detected object is determined to be the same as the object detected in the past at each time of detecting the object by the radar; and obstacle determining means for determining that the corresponding one of the detected object is the obstacle when the count added by the count adding means becomes equal to or larger than a predetermined threshold.

8. The obstacle detecting apparatus of a vehicle according to claim 2:

wherein different weights are added to a case of detecting an object by the fixed radar and a case of detecting the object by the pivoting radar and the detected object is determined to be the obstacle based on a total value of the weights.

9. The obstacle detecting apparatus of a vehicle according to claim 3:

wherein different weights are added to a case of detecting an object by the fixed radar and a case of detecting the object by the pivoting radar and the detected object is determined to be the obstacle based on a total value of the weights.

* * * * *